United States Patent
Takahashi

(10) Patent No.: US 9,121,341 B2
(45) Date of Patent: Sep. 1, 2015

(54) DUAL LINK INTERNAL COMBUSTION ENGINE

(71) Applicant: Nissan Motor Co., Ltd., Yokohama, Kanagawa (JP)

(72) Inventor: Eiji Takahashi, Isehara (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 13/856,222

(22) Filed: Apr. 3, 2013

(65) Prior Publication Data
US 2013/0312697 A1  Nov. 28, 2013

(30) Foreign Application Priority Data
May 23, 2012 (JP) ................. 2012-117052

(51) Int. Cl.
| | | |
|---|---|---|
| F16C 7/00 | (2006.01) | |
| F02B 77/00 | (2006.01) | |
| F02B 75/04 | (2006.01) | |
| F02B 23/10 | (2006.01) | |
| F02F 1/24 | (2006.01) | |
| F02B 75/02 | (2006.01) | |
| F16C 7/02 | (2006.01) | |
| F16C 9/04 | (2006.01) | |
| F16J 1/14 | (2006.01) | |
| F02B 75/32 | (2006.01) | |

(52) U.S. Cl.
CPC ............... *F02B 77/00* (2013.01); *F02B 23/104* (2013.01); *F02B 75/048* (2013.01); *F02F 1/242* (2013.01); *F02B 75/32* (2013.01); *F02B 2075/025* (2013.01); *F16C 7/023* (2013.01); *F16C 9/04* (2013.01); *F16J 1/14* (2013.01); *Y02T 10/125* (2013.01)

(58) Field of Classification Search
CPC ............ F16C 7/023; F16C 9/04; F02B 75/32; F02B 2075/025; F16J 1/14
USPC ........................................ 123/197.3
See application file for complete search history.

(56) References Cited

U.S. PATENT DOCUMENTS

| | | | | |
|---|---|---|---|---|
| 2,028,760 | A * | 1/1936 | Diilstrom .................. 123/305 |
| 6,170,454 | B1 * | 1/2001 | McFarland et al. ........ 123/193.6 |
| D609,247 | S * | 2/2010 | Naegele et al. ................. D15/5 |
| 2003/0010313 | A1 * | 1/2003 | Fukuzumi .................... 123/301 |
| 2004/0237918 | A1 * | 12/2004 | Mendler .................... 123/90.16 |
| 2006/0005701 | A1 * | 1/2006 | Huang ........................ 92/186 |
| 2006/0283415 | A1 * | 12/2006 | Murata ...................... 123/90.16 |
| 2009/0031994 | A1 * | 2/2009 | Kobayashi et al. ......... 123/48 B |
| 2009/0107453 | A1 * | 4/2009 | Takahashi et al. ......... 123/197.4 |
| 2010/0000493 | A1 * | 1/2010 | Nishimoto et al. ........... 123/261 |

FOREIGN PATENT DOCUMENTS

JP     3911977 B     5/2007

* cited by examiner

*Primary Examiner* — Lindsay Low
*Assistant Examiner* — Charles Brauch
(74) *Attorney, Agent, or Firm* — Global IP Counselors, LLP

(57) ABSTRACT

A dual link internal combustion engine, as viewed in a crank axial direction where a crankshaft rotates clockwise, has a following relative configuration. A piston pin center axis is offset to a right side of a piston center line extending through a center of a piston crest surface of a piston. A movement trajectory of a link coupling center of first and second links is positioned to a left side of a piston reciprocation line. A piston center of gravity is positioned to the left side. An average value of a distance in the cylinder axial direction to individual points of the piston crest surface from a reference plane passing through the piston pin center axis and orthogonal to the cylinder axial direction in an area to the left side is greater than an average value of the distance in an area to the right side.

9 Claims, 4 Drawing Sheets

DUAL LINK INTERNAL COMBUSTION ENGINE

CROSS-REFERENCE TO RELATED APPLICATIONS

This application claims priority to Japanese Patent Application No. 2012-117052, filed on May 23, 2012. The entire disclosure of Japanese Patent Application No. 2012-117052 is hereby incorporated herein by reference.

BACKGROUND

1. Field of the Invention

The present invention generally relates to a dual link internal combustion engine. More specifically, the present invention relates to a dual link internal combustion engine in which a piston and a crankshaft are coupled via a dual link piston-crank mechanism.

2. Background Information

Various dual link internal combustion engines have been proposed in which a crank pin of a crankshaft and a piston pin of a piston are coupled by a plurality of links. One example of such an engines is disclosed in Japanese Patent Publication No. 3911977. In this publication, a dual link piston-crank mechanism is disclosed in which the center position of a piston pin is offset to one side from a piston center axis, the piston's center of gravity position is offset to the other side relative to a piston reciprocation line passing through the piston pin center and extending in a cylinder axial direction, and the orientation of the piston is controlled when the piston bears thrust force. Specifically, by considering factors such as the position of the point where a combustion load or an inertial load acts on the piston, and the direction of the tilt of the link, the highly rigid top end of the piston can be suppressed from colliding with the side surface of the cylinder, and friction loss and noise can be reduced.

SUMMARY

However, the above publication does not specifically disclose the manner in which the piston's center of gravity position is offset. For example, with a method of casting a balance weight made of a metal of high specific gravity in a piston made of a light alloy, problems are encountered such as increased weight of the piston and worsening of vibration.

In view of the state of the known technology, one aspect of the present disclosure is to provide a dual link internal combustion engine that basically comprises a cylinder block, a piston, a crankshaft and a plurality of links. The cylinder block defines a cylinder. The piston is slidably disposed in the cylinder. The crankshaft is rotatably mounted with respect to the cylinder block. The plurality of links couples a piston pin of the piston to a crank pin of the crankshaft to reciprocate the piston in the cylinder as the crankshaft rotates. The plurality of links includes a first link coupled at a first end to the piston pin and a second link coupled to a second end of the first link. As viewed in a crank axial direction where a piston top dead center is at a top and a piston bottom dead center is at a bottom as the crankshaft rotates clockwise, the piston, the piston pin and the first and second links having a following relative configuration. The piston pin has a piston pin center axis that is offset to a right side of a piston center line, which extends through a center of a piston crest surface of the piston. An overall movement trajectory of a link coupling center between the first link and the second link as the piston reciprocates is positioned to a left side of a piston reciprocation line extending in a cylinder axial direction through the piston pin center axis. A piston center of gravity is positioned to the left side of the piston reciprocation line. An average value of a distance in the cylinder axial direction to individual points of the piston crest surface from a reference plane passing through the piston pin center axis and orthogonal to the cylinder axial direction in an area to the left side of the piston reciprocation line is greater than an average value of the distance in an area to the right side.

The distance along the cylinder axial direction to the individual points of the piston crest surface from the reference plane passing through the piston pin center and orthogonal to the cylinder axial direction represents the unevenness of the piston crest surface, and the average value throughout the entire piston crest surface is equivalent to increase and decrease in the combustion chamber capacity due to the unevenness of the piston crest surface. In other words, when a dimension other than the shape of the piston crest surface is defined, such as the combustion chamber capacity on the cylinder head side or the position of the piston pin in the cylinder axial direction at top dead center, and a predetermined mechanical compression ratio is planned, the aforementioned average value will be the defined value (i.e. a value corresponding to the mechanical compression ratio).

Concerning the distance in the cylinder axial direction to different parts of the piston crest surface from the reference plane passing through the piston pin center and orthogonal to the cylinder axial direction, if the average value in the area to the left side of the piston reciprocation line is greater than the average value to the right, as is the case in the present invention, the piston center of gravity is shifted to the left side of the piston reciprocation line. Particularly, if the average value in the left area is relatively greater than the average value in the right area so as to keep the average value throughout the entire piston surface at a value corresponding to the predetermined mechanical compression ratio, the piston center of gravity can be shifted to the left while planning a target value for the mechanical compression ratio, and friction loss and noise can be reduced while suppressing an increase in the weight of the piston due to the addition of a balance weight or the like.

Accordingly with this dual link internal combustion engine, because the piston center of gravity is nearer to one side due to the uneven shape of the piston crest surface, there are no problems such as worsening vibration due to increased weight of the piston, and the combination of offsetting the piston pin position and inclining the first link in the specified direction makes it possible to suppress collisions between the top end of the piston and the cylinder side wall due to thrust force.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
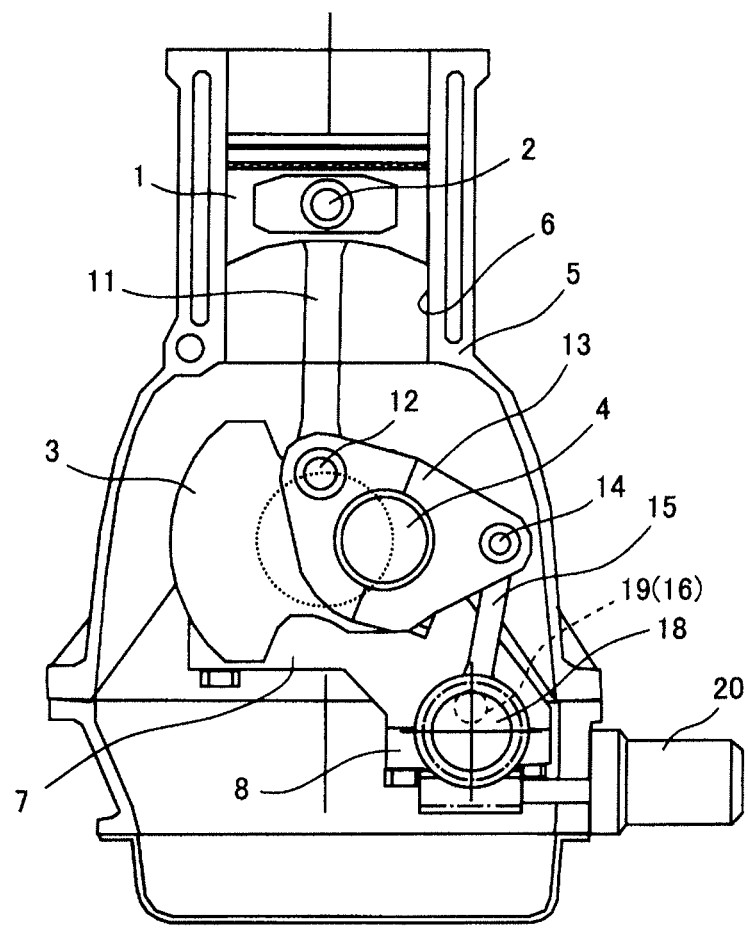
FIG. 1 is a diagram showing the basic configuration of a dual link internal combustion engine used in the illustrated embodiments.

Referring initially to FIG. 1, a dual link internal combustion engine is schematically for each of that illustrated embodiments. This is an example particularly in which a dual link piston-crank mechanism is used as a variable compression ratio mechanism, wherein a piston 1 is slidably placed within a cylinder 6 formed in a cylinder block 5, as shown in the drawing, and one end of an upper link 11 (a first link) is slidably coupled via a piston pin 2. The other end of the upper link 11 is rotatably coupled to one end of a lower link 13 (a second link) via an upper pin 12. The lower link 13 is swingably attached at the middle to a crank pin 4 of a crankshaft 3. The lower link 13 is divided in two parts, either top and bottom or left and right, and the two parts are integrated by a bolt (not shown).

The crankshaft 3 is rotatably supported on the cylinder block 5 by a crank bearing bracket 7, and the crankshaft 3 rotates clockwise in the drawing along with the rising and falling of the piston 1. Therefore, FIG. 1 is equivalent to a crank axial direction view in which the piston top dead center is at the top, the piston bottom dead center is at the bottom, and the crankshaft 3 rotates clockwise.

One end of a control link 15 is rotatably coupled via a control pin 14 to the other end of the lower link 13. The other end of the control link 15 is swingably supported on part of the internal combustion engine main body. In this example, the position of a swinging fulcrum 16 thereof is capable of being displaced relative to the internal combustion engine main body in order to vary the compression ratio. Specifically, a control shaft 18 is provided extending parallel with the crankshaft 3, and the other end of the control link 15 is rotatably fitted with an eccentric shaft 19 provided eccentrically to the control shaft 18. The control shaft 18 is rotatably supported between the crank bearing bracket 7 described above and a control bearing bracket 8, and is linked with a suitable actuator mechanism 20.

FIG. 1 is merely a schematic depiction of the basic configuration of the overall dual link internal combustion engine, and the position of the piston pin 2 and other features do not necessarily reflect the configuration of the present invention.

Figure 2:
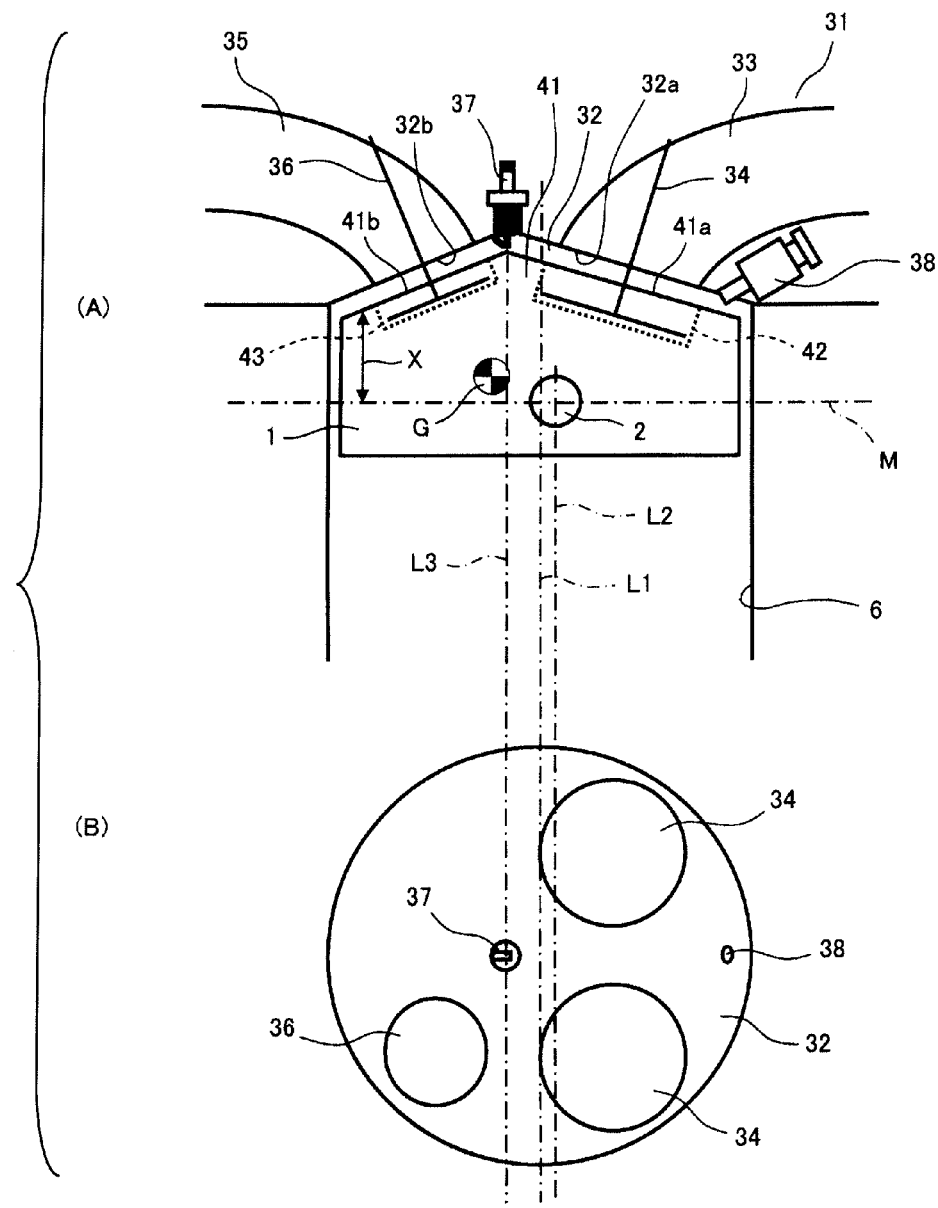
FIG. 2 is a pair of diagrammatic illustrations showing a combustion chamber and a piston in accordance with a first embodiment with illustration (A) being a longitudinal cross-sectional view of the combustion chamber and the piston, and illustration (B) being a bottom plan view of a top surface of the combustion chamber.

FIG. 2 shows the specific configuration of the piston 1 and the configuration of a combustion chamber 32 on the side of a cylinder head 31 in the first embodiment of the present invention. Illustration (A) of FIG. 2 is a cross-sectional view showing a cross section of the cylinder 6 and the combustion chamber 32 along the center axis line of the cylinder 6, and though the piston-crank mechanism is omitted, illustration (A) of FIG. 2 is a crank axial direction view similar to FIG. 1. In other words, illustration (A) of FIG. 2 is a crank axial direction view in which the piston top dead center is at the top, the piston bottom dead center is at the bottom, and the crankshaft 3 rotates clockwise. Illustration (B) of FIG. 2 is a plan view of the combustion chamber 32 as seen from below without the piston 1, and the left-to-right positional relationships of the components in the drawing correspond to those in illustration (A) of FIG. 2.

In FIG. 2, the line indicated by the symbol L1 is a piston center line extending in the axial direction of the cylinder 6 through the crest surface center of the piston 1. This piston center line L1 substantially coincides with the center axis line of the cylinder 6.

The line indicated by the symbol L2 is a piston reciprocation line extending in the axial direction of the cylinder 6 through the center of the piston pin 2. In other words, the piston pin 2 reciprocates up and down in the drawing along the piston reciprocation line L2. The piston pin 2 is disposed so that the center position thereof is to the right of the piston center line L1 in FIG. 1 and the crank axial direction view of illustration (A) of FIG. 2. Therefore, the piston reciprocation line L2 is to the right of the piston center line L1.

FIG. 2 does not show the piston-crank mechanism, but the movement trajectory of the center of the upper pin 12 (i.e. the link coupling center) coupling the previously described upper link 11 and lower link 13 together is positioned to the left side of the piston reciprocation line L2. This movement trajectory has a shape resembling a vertically long and thin ellipsoid, but the overall trajectory is to the left side of the piston reciprocation line L2. Therefore, the upper link 11 is constantly maintained in a state of being inclined in a certain direction, and the inclined direction is not reversed.

The center of gravity G of the piston 1 is positioned to the left side of the piston reciprocation line L2 as shown in the drawings.

Due to the combination of the offsetting of the center of the piston pin 2, the tilt of the upper link 11 in the specified direction, and the offsetting of the center of gravity G of the piston 1 as described above, the orientation of the piston 1 is controlled to the desired state and the highly rigid top end of the piston 1 is suppressed from colliding with the wall surface of the cylinder 6 due to thrust force. The mechanism of such an action is described in detail in Japanese Patent Publication No. 3911977, previously described, and because the present invention is not particularly different in this respect, the mechanism is not described herein.

In the illustrated embodiment, because the center of gravity G of the piston 1 is located to the left side of the piston reciprocation line L2, the uneven shape of the crest surface of the piston 1 is essentially altered, which is described below.

In the illustrated embodiment shown in FIG. 2, the combustion chamber 32 has a pent roof configuration comprising two inclined surfaces 32a and 32b. An intake port 33 and an intake valve 34 are disposed on the inclined surface 32a in the right side of the drawing. An exhaust port 35 and an exhaust valve 36 are disposed on the inclined surface 32b in the left side of the drawing. A sparkplug 37 is disposed at the peak of the pent roof where the two inclined surfaces 32a and 32b meet, and a fuel injection valve 38 is disposed in the side part of the combustion chamber 32 where the bottom of the intake port 33 is located.

The crest surface of the piston 1 is provided with a convex part 41 having inclined surfaces 41a and 41b corresponding to the inclined surfaces 32a and 32b of the pent roof type combustion chamber 32 described above. At the piston top dead center position, this convex part 41 enters the combustion chamber 32 on the cylinder head 31 side so as to leave a comparatively small gap corresponding to the desired compression ratio between the inclined surfaces 32a and 32b of the combustion chamber 32. To avoid interference with the intake valve 34 and the exhaust valve 36, discoid concave parts, i.e. valve recesses 42 and 43 are provided respectively in the inclined surfaces 41a and 41b.

In the piston 1 described above, using the term "reference plane M" to describe the plane passing through the piston pin 2 and orthogonal to the axial direction of the cylinder 6, and measuring the distance X from the reference plane M to different parts of the crest surface of the piston 1 along the axial direction of the cylinder 6, the average value of the distance X in areas to the left side of the piston reciprocation line L2 is relatively greater than the average value of the distance X in areas to the right side of the piston reciprocation line L2. Thereby, the center of gravity G of the piston 1 is positioned to the left side of the piston reciprocation line L2 as described above.

More specifically, the combustion chamber 32 and the piston 1 of the embodiment shown in FIG. 2 have several characteristics as shown below.

First, the peak position of the pent roof of the combustion chamber 32 (and consequently the peak position of the convex part 41 of the piston 1) is to the left side of the piston reciprocation line L2, and particularly in this embodiment, the peak position is offset to the left of the piston center line L1. The line L3 in FIG. 2 is a pent roof peak line extending in the axial direction of the cylinder 6 through the peak of the pent roof. The inclined angles of the two inclined surfaces 32a and 32b differ with the offsetting of this peak position, and compared to the angle formed by the center axis line of the intake valve 34 and the piston center line L1, the angle formed by the center axis line of the exhaust valve 36 and the piston center line L1 is relatively greater. In other words, the orientation of the intake valve 34 is more nearly upright than that of the exhaust valve 36.

While two intake valves 34 are provided, there is only one exhaust valve 36. Furthermore, the diameter of the exhaust valve 36 is smaller than the diameters of the intake valves 34. The valve recesses 42 and 43 provided in the piston 1 have shapes corresponding to the intake valves 34 and the exhaust valve 36, and the diameter of the valve recess 43 for the exhaust valve 36 is therefore smaller than the diameter of the valve recesses 42 for the intake valves 34. There are two valve recesses 42 for the intake valves 34, and only one valve recess 43 for the exhaust valve 36.

Figure 3:
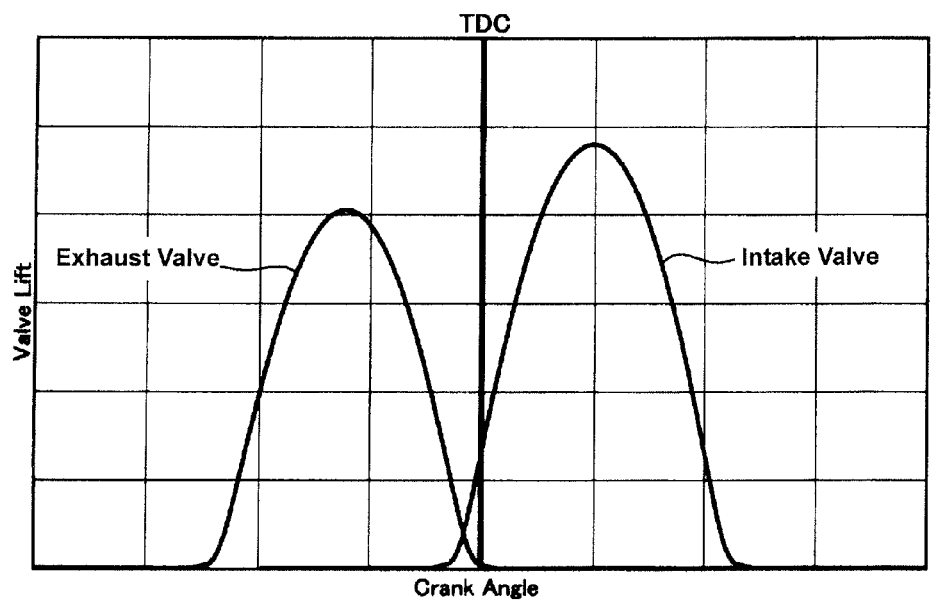
FIG. 3 is a graph of the lift characteristics of the intake valve and the exhaust valve.

The valve recesses 42 and 43 are adapted for avoiding interference with the piston 1 when the piston 1 is near the top dead center, but when all the lift amounts at the piston top dead center are compared as shown by the valve lift characteristics in FIG. 3, the lift amount of the exhaust valve 36 is less than the lift amount of the intake valves 34. Furthermore, compared to the amount of overlap between the open time duration of the intake valves 34 and the piston top dead center (in other words, the crank angle from the open time duration of the intake valves 34 to the piston top dead center), the amount of overlap between the open time duration of the exhaust valve 36 and the piston top dead center (in other words, the crank angle from the piston top dead center to the open time duration of the exhaust valve 36) is smaller.

Based on such valve lift characteristics, the depths of the valve recesses 42 and 43 provided in the piston 1 are such that the depth of the valve recess 43 for the exhaust valve 36 is less than the depths of the valve recesses 42 for the intake valves 34.

Thus, in the above embodiment, the center of gravity G of the piston 1 is disposed to the left side of the piston reciprocation line L2 due to a combination of several characteristics. In such an embodiment, the center of gravity G can be disposed as desired without inducing an unnecessary increase in the weight of the piston 1. There is also no need for unnecessary unevenness aside from the valve recesses 42 and 43 for the uneven shape of the crest surface of the piston 1, the surface area of the crest surface of the piston 1 therefore does not increase unnecessarily, and increases in cold loss can therefore be avoided.

In the above embodiment, several characteristics are combined, but it is possible to achieve the desired placement of the center of gravity G with one or more combinations.

Figure 4:
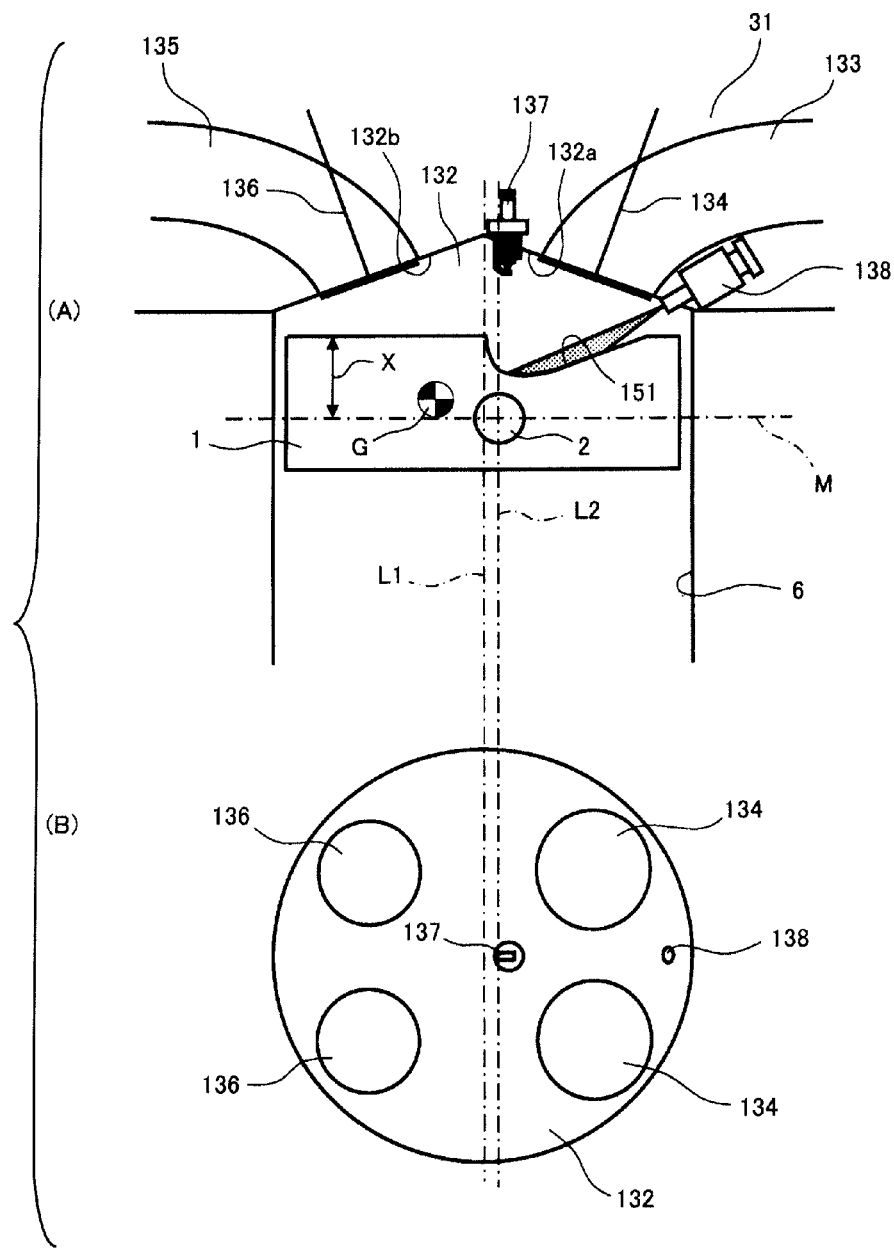
FIG. 4 is a pair of diagrammatic illustrations showing a combustion chamber and a piston in accordance with a second embodiment with illustration (A) being a longitudinal cross-sectional view of the combustion chamber and the piston, and illustration (B) being a bottom plan view of a top surface of the combustion chamber.

Next, FIG. 4 shows the second embodiment of the invention. Illustration (A) of FIG. 4 is a cross-sectional view showing a cross section of the cylinder 6 and a combustion chamber 132 along the center axis line of the cylinder 6, and though the piston-crank mechanism is omitted, illustration (A) of FIG. 4 is a crank axial direction view similar to FIG. 1. In other words, illustration (A) of FIG. 4 is a crank axial direction view in which the piston top dead center is at the top, the piston bottom dead center is at the bottom, and the crankshaft 3 rotates clockwise. Illustration (B) of FIG. 4 is a plan view of the combustion chamber 132 as seen from below without the piston 1, and the left-to-right positional relationships of the components in the drawing correspond to those in illustration (A) of FIG. 4.

Similar to FIG. 2 previously described, the line indicated by the symbol L1 is a piston center line extending in the axial direction of the cylinder 6 through the crest surface center of the piston 1. This piston center line L1 substantially coincides with the center axis line of the cylinder 6. The line indicated by the symbol L2 is a piston reciprocation line extending in the axial direction of the cylinder 6 through the center of the piston pin 2. In other words, the piston pin 2 reciprocates up and down in the drawing along the piston reciprocation line L2. The piston pin 2 is disposed so that the center position thereof is offset to the right of the piston center line L1 in FIG. 1 and the crank axial direction view of illustration (A) of FIG. 4. Therefore, the piston reciprocation line L2 is to the right of the piston center line L1.

FIG. 4 does not show the piston-crank mechanism, but the movement trajectory of the center of the upper pin 12 (i.e. the link coupling center) coupling the previously described upper link 11 and lower link 13 together is positioned to the left side of the piston reciprocation line L2. This movement trajectory has a shape resembling a vertically long and thin ellipse, but the overall trajectory is to the left side of the piston reciprocation line L2. Therefore, the upper link 11 is constantly maintained in a state of being inclined in a certain direction, and the inclined direction is not reversed.

The center of gravity G of the piston 1 is positioned to the left side of the piston reciprocation line L2 as shown in the drawings.

In the embodiment shown in FIG. 4, the combustion chamber 132 has a pent roof configuration having inclined surfaces 132a and 132b, but the peak position lies on the piston center line L1. An intake port 133 and an intake valve 134 are disposed on the inclined surface 132a in the right side of the drawing, and an exhaust port 135 and an exhaust valve 136 are disposed on the inclined surface 132b in the left side of the drawing. In the present embodiment, a pair of intake valves 134 and a pair of exhaust valves 136 are provided. A sparkplug 137 is disposed to the right in the drawing, or in other words slightly toward the intake valves 134, from the peak of the pent roof where the two inclined surfaces 132a and 132b meet. A fuel injection valve 138 is disposed in the side part of the combustion chamber 132 where the bottom of the intake port 133 is located, so as to inject fuel at a downward incline.

The crest surface of the piston 1c is provided with a cavity 151, which is recessed so as to catch the spray of fuel from the fuel injection valve 138. Aside from this cavity 151, the crest surface of the piston 1c is a virtually flat surface in the illustrated example, but the crest surface may also have a shape which swells toward the combustion chamber 132, similar to the embodiment in FIG. 2. The cavity 151 is provided in the area to the right of the piston center line L1, and a large part of the cavity lies to the right side of the piston reciprocation line L2. The cavity 151 also serves as a recess for avoiding interference with the sparkplug 137, and the cavity is therefore formed in a range that includes a position directly below the sparkplug 137.

Due to the uneven shape in the crest surface of the piston 1 described above, when measuring the distance X to different parts of the crest surface of the piston 1 from the reference plane M which passes through the center of the piston pin 2 and is orthogonal to the axial direction of the cylinder 6, the average value of the distance X in areas to the left side of the piston reciprocation line L2 is relatively greater than the average value of the distance X in areas to the right side of the piston reciprocation line L2. Thereby, the center of gravity G of the piston 1 is positioned to the left side of the piston reciprocation line L2 as described above.

While only selected embodiments have been chosen to illustrate the present invention, it will be apparent to those skilled in the art from this disclosure that various changes and modifications can be made herein without departing from the scope of the invention as defined in the appended claims. For example, the present invention can also be similarly applied to an internal combustion engine comprising a variable compression ratio mechanism wherein the mechanical compression ratio can be varied by changing factors such as the absolution position of the piston at top dead center, and the capacity of the combustion chamber on the cylinder head side. Also it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A dual link internal combustion engine comprising:
   a cylinder block defining a cylinder;
   a piston slidably disposed in the cylinder;
   a crankshaft rotatably mounted with respect to the cylinder block;
   an exhaust valve;
   an intake valve;
   a plurality of links coupling a piston pin of the piston to a crank pin of the crankshaft to reciprocate the piston in the cylinder as the crankshaft rotates, the plurality of links including a first link coupled at a first end to the piston pin and a second link coupled to a second end of the first link; and
   a combustion chamber having a pent roof with angled wall surfaces of generally conical shape with a peak of the pent roof being a meeting of the angled wall surfaces and being positioned to one side of a piston reciprocation line without intersecting the piston reciprocation line, the exhaust valve being disposed on a combustion chamber wall surface to the left side of the piston reciprocation line and the intake valve being disposed on the combustion chamber wall surface to a right side of the piston reciprocation line,
   as viewed in a crank axial direction where a piston top dead center is at a top and a piston bottom dead center is at a bottom as the crankshaft rotates clockwise, the piston, the piston pin and the first and second links having a following relative configuration in which
   the piston pin has a piston pin center axis that is offset to a right side of a piston center line, which extends through a center of a piston crest surface of the piston,
   an overall movement trajectory of a link coupling center between the first link and the second link as the piston reciprocates is positioned to a left side of a piston reciprocation line extending in a cylinder axial direction through the piston pin center axis,
   a piston center of gravity is positioned to the left side of the piston reciprocation line,
   an average value of a distance in the cylinder axial direction to individual points of the piston crest surface from a reference plane passing through the piston pin center axis and orthogonal to the cylinder axial direction in an area to the left side of the piston reciprocation line is greater than an average value of the distance in an area to the right side, and
   the piston crest surface of the piston including an exhaust valve recess in the area to the left side of the piston reciprocation line and an intake valve recess in the area to the right side of the piston reciprocation line, with the exhaust valve recess having a diameter that is smaller than a diameter of the intake valve recess, and the depth of the exhaust valve recess being less than the depth of the intake valve recess.

2. The dual link internal combustion engine according to claim 1, wherein
   a valve lift amount at the piston top dead center of the exhaust valve positioned to the left side of the piston reciprocation line is less than a valve lift amount at the piston top dead center of the intake valve positioned to the right side of the piston reciprocation line.

3. The dual link internal combustion engine according to claim 1, wherein
   an amount of overlap between the piston top dead center and an open time duration of the exhaust valve positioned to the left side of the piston reciprocation line is less than an amount of overlap between the piston top dead center and an open time duration of the intake valve positioned to the right side of the piston reciprocation line.

4. The dual link internal combustion engine according to claim 1, wherein
   the piston crest surface of the piston includes a plurality of valve recesses with fewer of the valve recesses being disposed in the area to the left side of the piston reciprocation line than in the area to the right side of the piston reciprocation line.

5. The dual link internal combustion engine according to claim 1, wherein
   the crank axial direction view, the angle formed by the piston center line and a valve center line of the valve positioned to the left side of the piston reciprocation line is greater than the angle formed by the piston center line and a valve center line of the valve positioned to the right side.

6. The dual link internal combustion engine according to claim 1, further comprising
   a fuel injection valve for injecting fuel directly into the cylinder; at least part of a cavity provided to the piston crest surface so as to catch fuel spray from the fuel injection valve being formed to the right side of the piston reciprocation line in the crank axial direction view.

7. The dual link internal combustion engine according to claim 6, wherein
the fuel injection valve is disposed on the right side of the piston reciprocation line.

8. The dual link internal combustion engine according to claim 1, further comprising
a sparkplug is disposed to the right side of the piston reciprocation line.

9. The dual link internal combustion engine according to claim 2, wherein
the piston crest surface of the piston includes a plurality valve recesses with fewer of the valve recesses being disposed in the area to the left side of the piston reciprocation line than in the area to the right side of the piston reciprocation line.

* * * * *